United States Patent
Tsai et al.

(10) Patent No.: US 8,331,707 B2
(45) Date of Patent: Dec. 11, 2012

(54) ELECTRICAL-DEVICE-IMPLEMENTED IMAGE CODING METHOD

(75) Inventors: Tsung-Han Tsai, Taoyuan County (TW); Yu-Hsuan Lee, Taipei County (TW); Yi-Cheng Chen, Pingtung County (TW)

(73) Assignee: National Central University, Taoyuan County (TW)

( * ) Notice: Subject to any disclaimer, the term of this patent is extended or adjusted under 35 U.S.C. 154(b) by 324 days.

(21) Appl. No.: 12/897,801

(22) Filed: Oct. 5, 2010

(65) Prior Publication Data

US 2011/0274365 A1    Nov. 10, 2011

(30) Foreign Application Priority Data

May 10, 2010 (TW) ................................ 99114860 A

(51) Int. Cl.
G06K 9/36 (2006.01)
(52) U.S. Cl. ........................................................ 382/244
(58) Field of Classification Search ........................ None
See application file for complete search history.

(56) References Cited

U.S. PATENT DOCUMENTS

| | | | | | |
|---|---|---|---|---|---|
| 4,558,350 | A | * | 12/1985 | Murakami | ............... 375/240.12 |
| 6,320,981 | B1 | * | 11/2001 | Yada | .......................... 382/168 |
| 6,587,603 | B1 | * | 7/2003 | Sakurai et al. | ................ 382/312 |
| 2004/0057701 | A1 | * | 3/2004 | Tsai et al. | ........................ 386/96 |
| 2008/0175316 | A1 | * | 7/2008 | Han | .......................... 375/240.12 |
| 2009/0067737 | A1 | * | 3/2009 | Takahashi et al. | ............. 382/251 |
| 2010/0296745 | A1 | * | 11/2010 | Strom et al. | .................... 382/233 |

OTHER PUBLICATIONS

Yu-Hsuan Lee, Yi-Cheng Chen, Tsung-Han Tsai: A bandwidth-efficient embedded compression algorithm using two-level rate control scheme for video coding system. ISCAS 2010: 1149-1152.*
M. J. Weinberger, G. Seroussi, and G. Sapiro, "The LOCO-I Lossless Image Compression Algorithm: Principles and Standardization into JPEG-LS," IEEE Trans. Image Processing, vol. 9, No. 8, pp. 1309-1324, Aug. 2000.*

* cited by examiner

*Primary Examiner* — Wenpeng Chen
*Assistant Examiner* — Feng Niu
(74) *Attorney, Agent, or Firm* — CKC & Partners Co., Ltd.

(57) ABSTRACT

An electrical-device-implemented image coding method includes: a raw block is obtained from an image. There are a max pixel value and a min pixel value among the raw pixel values of the image. A first difference sum, which is sum of differences between the raw pixel values and the max pixel value respectively, are calculated. A second difference sum, which is sum of differences between the raw pixel values and the min pixel value respectively, are calculated. If the first difference sum is not smaller than the second difference sum, each of the residue values is calculated by subtracting the min pixel value from the corresponding raw pixel value. Otherwise, each of the residue values is calculated by subtracting the corresponding raw pixel value from the max pixel value. Each of the residue values is encoded into a compressed codeword. A bit stream is generated according to the compressed codewords.

11 Claims, 1 Drawing Sheet

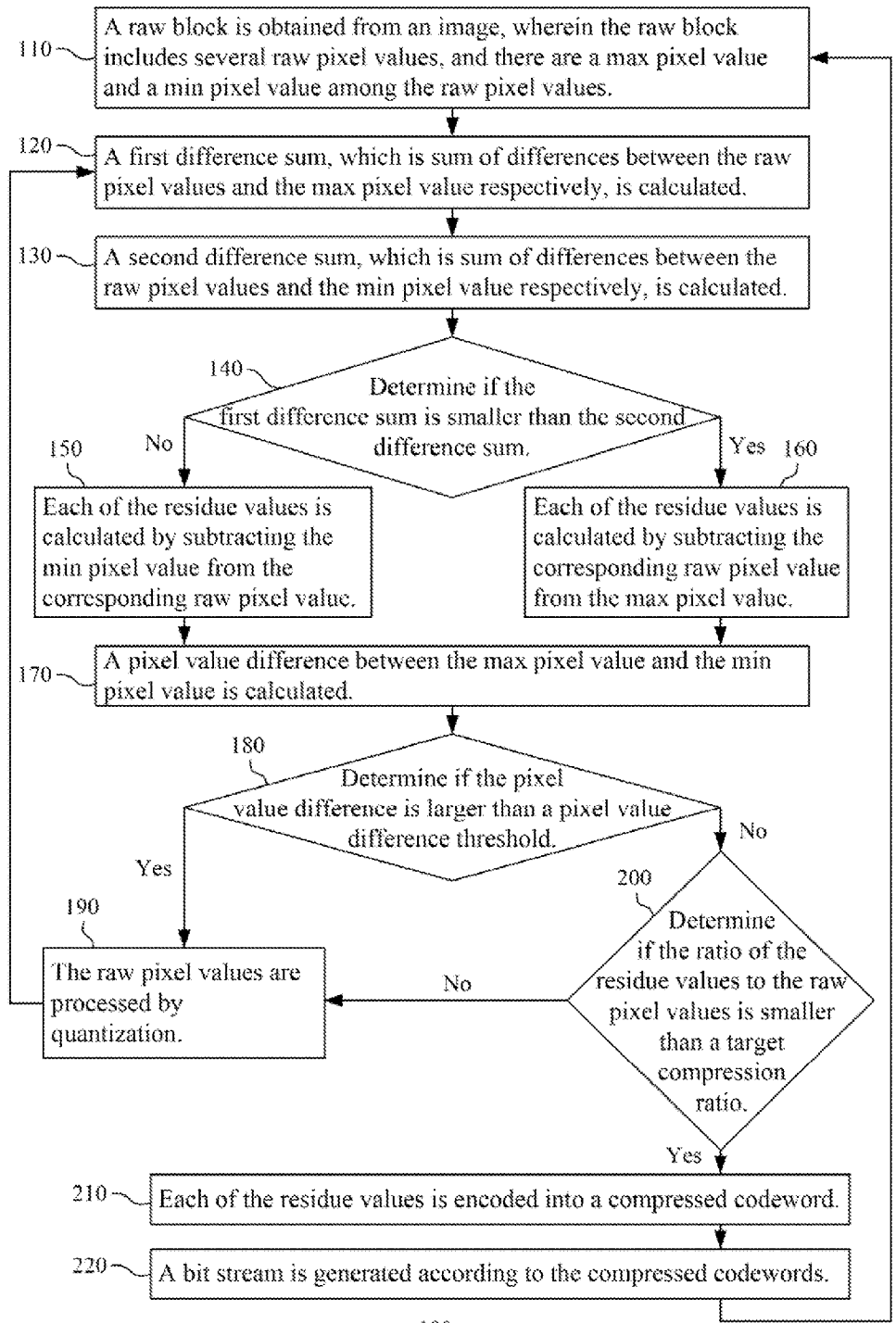

ELECTRICAL-DEVICE-IMPLEMENTED IMAGE CODING METHOD

RELATED APPLICATIONS

This application claims priority to Taiwan Application Serial Number 99114860, filed May 10, 2010, which is herein incorporated by reference.

BACKGROUND

1. Technical Field

The present invention relates to an electrical-device-implemented image coding method.

2. Description of Related Art

Image coding technology can be lossy coding or lossless. Lossless image coding makes image data coded without distortion; lossy coding makes image data coded with distortion. Lossless image coding is often preferred for applications, which require high image quality. For example, when the image coding is applied to remote nursing, doctors must diagnose patients' condition according to the patients' images transmitted remotely, which requires high image quality.

File sizes of high quality images are often very large, which requires more bandwidth for transmission. In addition, more number to access external rams is needed if complicated coding algorithm is utilized. More bandwidth for transmission and more number to access external rams both cause higher power consumption. Therefore, as image quality increases, it is an important issue to design an image coding system with fewer transmission bandwidth and power consumption.

SUMMARY

According to one embodiment of this invention, an electrical-device-implemented image coding method is provided. In the electrical-device-implemented image coding method, a reference value for encoding, which differs least from other raw pixel values, is selected among the max pixel value and the min pixel value. The electrical-device-implemented image coding method includes the following steps: A raw block is obtained from an image. The raw block includes several raw pixel values, and there are a max pixel value and a min pixel value among the raw pixel values. A first difference sum, which is sum of differences between the raw pixel values and the max pixel value respectively, is calculated. A second difference sum, which is sum of differences between the raw pixel values and the min pixel value respectively, is calculated. Several residue values corresponding to the raw pixel values are calculated. If the first difference sum is not smaller than the second difference sum, each of the residue values is calculated by subtracting the min pixel value from the corresponding raw pixel value. If the first difference sum is smaller than the second difference sum, each of the residue values is calculated by subtracting the corresponding raw pixel value from the max pixel value. Each of the residue values is encoded into a compressed codeword. A bit stream is generated according to the compressed codewords.

Above all, smaller residue values corresponding to the raw pixel values can be calculated, which can reduce the file size after encoded. Therefore, the bit stream generated after encoded may have higher compression effect, which reduce the storage space to store the generated bit stream and the bandwidth to transmit the generated bit stream. Besides, complicated algorithms are not utilized in one embodiment of this invention. Therefore, when electrical devices applies one embodiment of this invention, number to access external rams can be reduced and fewer system resources are required, which can reduce power consumption of the electrical devices.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 1 is a flow diagram of an electrical-device-implemented image coding method according to one embodiment of this invention.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

FIG. 1 is a flow diagram of an electrical-device-implemented image coding method according to one embodiment of this invention. In the electrical-device-implemented image coding method, a reference value for encoding, which differs least from other raw pixel values, is selected among the max pixel value and the min pixel value. The electrical-device-implemented image coding method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives. In addition, the electrical-device-implemented image coding method may take the form of a program product stored on a storage medium having instructions embodied in the medium for electrical devices to execute. The electrical-device-implemented image coding method 100 includes the following steps:

In step 110, a raw block is obtained from an image. The raw block includes several raw pixel values, and there are a max pixel value and a min pixel value among the raw pixel values. The raw pixel values may be gray scale values, RGB values, CMYK values, YUV values or other color space values. In one embodiment, the image may be captured before step 110. In another embodiment, the image may be captured by an image-capturing method. In other embodiments, other methods may be utilized to obtain the image, which should not be limited by this disclosure.

In step 120, a first difference sum, which is sum of differences between the raw pixel values and the max pixel value respectively, is calculated. In one embodiment of step 120, the differences between the raw pixel values and the max pixel value may be calculated by respectively subtracting each of the raw pixel values from the max pixel value, and the calculated differences are summed to be the first difference sum.

In step 130, a second difference sum, which is sum of differences between the raw pixel values and the min pixel value respectively, is calculated. In one embodiment of step 130, the differences between the raw pixel values and the min pixel value may be calculated by subtracting the min pixel value from each of the raw pixel values respectively, and the calculated differences are summed to be the second difference sum.

In step 140, determine if the first difference sum is smaller than the second difference sum. Then, several residue values corresponding to the raw pixel values are calculated.

In step 150, if the first difference sum is not smaller than the second difference sum, each of the residue values is calculated by subtracting the min pixel value from the corresponding raw pixel value. In other words, the min pixel value is taken as the reference value for calculating the residue values corresponding to the raw pixel values.

In step 160, if the first difference sum is smaller than the second difference sum, each of the residue values is calculated by subtracting the corresponding raw pixel value from the max pixel value. In other words, the max pixel value is taken as the reference value for calculating the residue values corresponding to the raw pixel values. Therefore, the smaller residue values are calculated by taking the reference value, which differs less from the raw pixel values, among the min pixel value and the max pixel value utilizing step 140-160.

In step 210, each of the residue values is encoded into a compressed codeword. In one embodiment of step 210, a bit number for encoding each of the residue values respectively may be obtained, and each of the residue is values may be encoded into the compressed codeword with the corresponding bit number for encoding it. Wherein, obtaining the bit number for encoding each of the residue values is implemented as folows:

$$NB(x, y) = \begin{cases} \lceil \log_2(\text{delta}+1) \rceil; & \text{residue}(x, y) \geq \text{threshold} \\ \lfloor \log_2(\text{delta}+1) \rfloor; & \text{residue}(x, y) < \text{threshold} \end{cases}$$

The raw block is an M×N block, wherein M and N are natural numbers, which may be the same or different. $0 \leq x < M$, $0 \leq y < N$. (x,y) is one of the pixels on the raw block. NB(x,y) is the bit number for encoding the residue value of the pixel (x,y) on the raw block. delta is a pixel value difference between the max pixel value and the min pixel value. residue(x,y) is the residue value of the pixel (x,y). threshold is the encoding number threshold. For example, when delta is 6 and residue($x_1,y_1$)≥threshold. NB($x_1,y_1$), which is the bit number for encoding the residue value of the pixel ($x_1,y_1$), is $\lceil \log_2(6+1) \rceil = 3$. Therefore, residue($x_1,y_1$) may be encoded into the compressed codeword with 3 bits.

In addition, obtaining the encoding number threshold may be implemented as follows:

$$\text{threshold} = 2^{\lceil \log_2(\text{delta}+1) \rceil} - (\text{delta}+1)$$

Then, encoding each of the residue values into the compressed codeword (step 210) may be implemented as follows:

$$EncodedSymbol(x, y) = \begin{cases} \text{residue}(x, y) & ; \text{residue}(x, y) < \text{threshold} \\ \text{residue}(x, y) + \text{threshold} & ; \text{residue}(x, y) \geq \text{threshold} \end{cases}$$

wherein EncodedSymbol(x,y) is the compressed codeword of the pixel (x,y) on the raw block. Therefore, residue (x,y), which is the residue value of is the pixel (x,y), less than threshold may be encoded with fewer bits $\lfloor \log_2(\text{delta}+1) \rfloor$.

In another embodiment, encoding each of the residue values into the compressed codeword (step 210) may be implemented as follows:

$$EncodedSymbol(x, y) = \begin{cases} \text{residue}(x, y) & ; \text{residue}(x, y) < \text{threshold} \\ (\text{residue}(x, y) + \text{threshold})/2 & ; \text{residue}(x, y) \geq \text{threshold} \end{cases}$$

The raw block is an M×N block, wherein M and N are natural numbers, which may be the same or different. $0 \leq x < M$, $0 \leq y < N$. (x,y) is one of the pixels on the raw block. EncodedSymbol(x,y) is the compressed codeword of the pixel (x,y) on the raw block. residue(x,y) is the residue value of the pixel (x,y). threshold is the encoding number threshold. The encoding number threshold may be obtained by the equation threshold=$2^{\lceil \log_2(\text{delta}+1) \rceil}$-(delta+1). Therefore, since the file size of (residue(x,y)+threshold)/2 is half of the file size of residue(x,y)+threshold, the file size of the compressed codeword for (residue(x,y)+threshold)/2 is 1 bit less than the compressed codeword for residue(x,y) threshold when residue(x, y) threshold. Therefore, better compression effect can be achieved. In addition, the value of the compressed codeword (residue(x,y)+threshold)/2 for residue(x,y)≧threshold is larger than threshold. Hence, during the decoding process, the compressed codeword, value of which is larger than threshold, can be multiplied by 2 and then subtracted by threshold to obtain the original residue value residue(x,y).

In step 220, a bit stream is generated according to the compressed codewords. Wherein, at least one of the bits of the bit stream may be utilized to record the information that the encoding equation for residue(x,y) threshold is (residue(x, y)+threshold)/2 or residue(x,y)+threshold. In addition, at least one of the bits of the bit stream may be utilized to record the information that the reference value for calculating the residue values of the pixels is the max pixel value or the min pixel value. Besides, several bits of the bit stream may be utilized to record the information that the difference between the max pixel value or the min pixel value. Then, next raw block is obtained (step 110) to encode the next raw block.

If the difference between the max pixel value and the min pixel value is too large, more bits may be required for encoding, which may cause bad compression effect. Therefore, before step 210, a pixel value difference between the max pixel value and the min pixel value may be calculated (step 170), and determine if the pixel value difference is larger than a pixel value difference threshold (step 180). Wherein the pixel value difference threshold may be obtained before step 180. In addition, in one embodiment, step 170 may subtract the min pixel value from the max pixel to calculate the pixel value difference. In another embodiment, step 170 may take the residue value, which is calculated by subtracting the min pixel value from the max pixel in step 150 or step 160, as the pixel value difference between the max pixel value and the min pixel value.

In step 190, if the pixel value difference is larger than the pixel value difference threshold, the raw pixel values are processed by quantization to further compress the file size of the raw pixel values. Wherein, the quantization number, for which the raw pixel values are processed in step 190, may be recorded in several bits of the bit stream generated in step 220 for decoding. Therefore, the raw pixel values can be further compress through quantization. Then, the residue values corresponding to the quantization-processed raw pixel values are re-calculated through step 120-160. Besides, if the pixel value difference is not larger than the pixel value difference threshold, each of the residue values is compressed into the compressed codeword (step 210).

In addition, before step 210, step of determining if the ratio of the total file size of the residue values to the total file size of the raw pixel values is smaller than a target compression ratio (step 200) may be included. Wherein, the target compression ratio may be obtained before step 200. If the ratio of the total file size of the residue values to the total file size of the raw pixel values is not smaller than the target compression ratio, the raw pixel values are processed by quantization (step 190) to further compress the file size of the raw pixel values. Wherein, the quantization number, for which the raw pixel values are processed in step 190, may be recorded in several bits of the bit stream generated in step 220 for decoding. If the ratio of the total file size of the residue values to the total file size of the raw pixel values is not smaller than the target compression ratio, each of the residue values is compressed into the compressed codeword (step 210). Besides, in other embodiments, the determination of step 180 may be made after the determination of step 200 or at is the same time with the determination of step 200, which should not be limited in this disclosure.

Above all, smaller residue values corresponding to the raw pixel values can be calculated, which can reduce the file size after encoded. Therefore, the bit stream generated after encoded may have higher compression effect, which reduce the storage space to store the generated bit stream and the bandwidth to transmit the generated bit stream. Besides, complicated algorithms are not utilized in one embodiment of this invention. Therefore, when electrical devices applies one embodiment of this invention, number to access external rams can be reduced and fewer system resources are required, which can reduce power consumption of the electrical devices.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrical-device-implemented image coding method, comprising:
   obtaining a raw block from an image, wherein the raw block comprises a plurality of raw pixel values, and there are a max pixel value and a min pixel value among the raw pixel values;
   calculating a first difference sum, which is sum of differences between the raw pixel values and the max pixel value respectively;
   calculating a second difference sum, which is sum of differences between the raw pixel values and the min pixel value respectively;
   calculating a plurality of residue values corresponding to the raw pixel values,
   wherein each of the residue values is calculated by subtracting the min pixel value from the corresponding raw pixel value if the first difference sum is not smaller than the second difference sum,
   wherein each of the residue values is calculated by subtracting the corresponding raw pixel value from the max pixel value if the first difference sum is smaller than the second difference sum,
   encoding each of the residue values into a compressed codeword; and
   generating a bit stream according to the compressed codewords.

2. The electrical-device-implemented image coding method of claim 1, further comprising:
   calculating a pixel value difference between the max pixel value and the min pixel value;
   determining if the pixel value difference is larger than a pixel value difference threshold before encoding;
   if the pixel value difference is larger than the pixel value difference threshold, processing the raw pixel values by quantization; and
   if the pixel value difference is not larger than the pixel value difference threshold, encoding each of the residue values into the compressed codeword.

3. The electrical-device-implemented image coding method of claim 1, wherein encoding each of the residue values into the compressed codeword comprises:
   obtaining a bit number for encoding each of the residue values; and
   encoding each of the residue values into the compressed codeword with the bit number for encoding each of the residue values.

4. The electrical-device-implemented image coding method of claim 3, further comprising:
   obtaining an encoding number threshold,
   wherein obtaining the bit number for encoding each of the residue values is implemented as follows:

$$NB(x, y) = \begin{cases} \lceil \log_2(\text{delta}+1) \rceil; & \text{residue}(x, y) \geq \text{threshold} \\ \lfloor \log_2(\text{delta}+1) \rfloor; & \text{residue}(x, y) < \text{threshold} \end{cases}$$

wherein the raw block is an M×N block, $0 \leq x < M$, $0 \leq y < N$, (x,y) is one of the pixels on the raw block, NB(x,y) is the bit number for encoding the residue value of the pixel (x,y) on the raw block, delta is a pixel value difference between the max pixel value and the min pixel value, residue(x,y) is the residue value of the pixel (x,y), threshold is the encoding number threshold.

5. The electrical-device-implemented image coding method of claim 4, wherein obtaining the encoding number threshold is implemented as follows:

$$\text{threshold} = 2^{\lceil \log_2(\text{delta}+1) \rceil} - (\text{delta}+1)$$

wherein threshold is the encoding number threshold, delta is a pixel value difference between the max pixel value and the min pixel value.

6. The electrical-device-implemented image coding method of claim 1, further comprising:
obtaining an encoding number threshold,
wherein encoding each of the residue values into the compressed codeword is implemented as follows:

$$\text{EncodedSymbol}(x, y) = \begin{cases} \text{residue}(x, y) & ; \text{residue}(x, y) < \text{threshold} \\ \text{residue}(x, y) + \text{threshold} & ; \text{residue}(x, y) \geq \text{threshold} \end{cases}$$

wherein the raw block is an M×N block, $0 \leq x < M$, $0 \leq y < N$, (x,y) is one of the pixels on the raw block, EncodedSymbol(x,y) is the compressed codeword of the pixel (x,y) on the raw block, residue(x,y) is the residue value of the pixel (x,y), threshold is the encoding number threshold.

7. The electrical-device-implemented image coding method of claim 6, wherein obtaining the encoding number threshold is implemented as follows:

$$\text{threshold} = 2^{\lceil \log_2(\text{delta}+1) \rceil} - (\text{delta}+1)$$

wherein threshold is the encoding number threshold, delta is a pixel value difference between the max pixel value and the min pixel value.

8. The electrical-device-implemented image coding method of claim 1, further comprising:
obtaining an encoding number threshold,
wherein encoding each of the residue values into the compressed codeword is implemented as follows:

$$\text{EncodedSymbol}(x, y) = \begin{cases} \text{residue}(x, y) & ; \text{residue}(x, y) < \text{threshold} \\ (\text{residue}(x, y) + \text{threshold})/2 & ; \text{residue}(x, y) \geq \text{threshold} \end{cases}$$

wherein the raw block is an M×N block, $0 \leq x < M$, $0 \leq y < N$, (x,y) is one of the pixels on the raw block, EncodedSymbol(x,y) is the compressed codeword of the pixel (x,y) on the raw block, residue(x,y) is the residue value of the pixel (x,y), threshold is the encoding number threshold.

9. The electrical-device-implemented image coding method of claim 8, wherein obtaining the encoding number threshold is implemented as follows:

$$\text{threshold} = 2^{\lceil \log_2(\text{delta}+1) \rceil} - (\text{delta}+1)$$

wherein threshold is the encoding number threshold, delta is a pixel value difference between the max pixel value and the min pixel value.

10. The electrical-device-implemented image coding method of claim 1, further comprising
obtaining a target compression ratio;
if the ratio of the total file size of the residue values to the total file size of the raw pixel values is larger than the target compression ratio, processing the raw pixel values by quantization; and
if the ratio of the total file size of the residue values to the total file size of the raw pixel values is not larger than the target compression ratio, encoding each of the residue values into the compressed codeword.

11. The electrical-device-implemented image coding method of claim 1, further comprising:
capturing the image by a camera.

* * * * *